United States Patent [19]

Rüsche et al.

[11] Patent Number: 5,549,327
[45] Date of Patent: Aug. 27, 1996

[54] SHOCK ABSORBER FOR IMPROVING SAFETY IN PASSENGER COMPARTMENTS IN MOTOR VEHICLES

[75] Inventors: Heinz-Josef Rüsche, Drolshagen-Bleche; Norbert Bonhoff, Borken, both of Germany

[73] Assignee: Lignotock GmbH, Germany

[21] Appl. No.: 442,308

[22] Filed: May 16, 1995

[30] Foreign Application Priority Data

May 20, 1994 [DE] Germany .......................... 44 17 835.2

[51] Int. Cl.⁶ .......................... B60R 21/02; B60R 21/00; B60J 5/00; B62D 25/02
[52] U.S. Cl. ............................................ 280/751; 280/752
[58] Field of Search ...................... 280/751, 752

[56] References Cited

U.S. PATENT DOCUMENTS

| | | | |
|---|---|---|---|
| 3,715,130 | 2/1973 | Harada et al. | 280/751 |
| 5,098,124 | 3/1992 | Breed et al. | 280/751 |
| 5,141,279 | 8/1992 | Weller | 280/751 |
| 5,154,445 | 10/1992 | Weller | 280/751 |
| 5,370,417 | 12/1994 | Kelman et al. | 280/751 |

FOREIGN PATENT DOCUMENTS 1811453  6/1970  Germany .

OTHER PUBLICATIONS

Automobil Industrie Feb. 1974, pp. 63–69.

Primary Examiner—Kenneth R. Rice
Attorney, Agent, or Firm—Young & Basile, P.C.

[57] ABSTRACT

A shock absorber for improving the safety in passenger compartments of motor vehicles during impact accidents. It is intended that the impact between the outer skin of bodywork parts such as doors and the associated inner lining in the passenger compartment shall be reduced.

The shock absorber is in the form of an impact pot, in such a way that the energy absorption, at least to a considerable extent, is effected via a plurality of chronologically successive shearing procedures of the absorber material during an impact. The impact pot is subdivided into shearing zones for the successive shearing procedures, which are defined along enclosed curves. The impact pot is in the shape of a stepped pyramid or terrace arrangement with optional plan projections.

13 Claims, 2 Drawing Sheets

SHOCK ABSORBER FOR IMPROVING
SAFETY IN PASSENGER COMPARTMENTS
IN MOTOR VEHICLES

BACKGROUND OF THE INVENTION

The invention relates to shock absorbers for improving the safety in passenger compartments of motor vehicles during during impact accidents, preferably for reducing impact between the outer skin of bodywork parts such as doors, and the associated inner lining in the passenger compartment.

There has been no lack of suggested and actually realized projects in the prior art for improving the safety for drivers in their motor vehicles. In this connection, the development of special crush zones which reduce the frontal impact, and stiffening roll bars which ensure greater chances of survival during overturning of vehicles during accidents, are worthy of mention.

The improvement in side impact protection is also gaining increasing importance in motor vehicle technology. Reinforcing profiles or tubular constructions are located under the external skin, especially in the door shells. In supplement to this, it is known to insert between the outer skin and the inner lining, shock absorbers in the form of hard foam molded parts. Such shock absorbers have the advantage of fulfilling a double function during an accident. On the one hand they contribute to absorbing the impact energy, and on the other they are intended to reduce impact forces occurring on the occupants of the vehicle, particularly in their pelvic areas. In order to satisfy both requirements, however, it is necessary as a force-path characteristic in impact absorption to rapidly reach a predetermined power absorption level. This level is to be maintained to a large extent over the impact path. In general engineering, dangerous machine overloads are avoided by the deformation of impact pots specially provided for this purpose. Because of the relatively short impact paths between bodywork metal and internal lining, the use of conventionally constructed impact pots as side impact protection in motor vehicles is problematic, and has to date not even been regarded as approximative. Impact pots to rapidly in an uncontrolled manner can penetrate in certain areas through the inner lining members used in motor vehicles. Therefore, this method has been avoided for this reason alone. In a later side impact, previous impact pots could for this reason offer little protection; and they would instead lead to an additional risk, e.g. by splintering or cold fracture.

For this and other reasons, therefore, efforts to improve side impact protection have been concentrated on an appropriate force coupling between the bodywork metal and the internal lining by using hard form elements, even though only a relatively poor force-path characteristic with regard to impact absorption could be obtained with these elements. In the first portion of the impact path available, the force absorption is small and subsequently the transmission of force increases disproportionately steeply.

SUMMARY OF THE INVENTION

The purpose underlying the invention therefore is to indicate a safety shock absorber which has an improved force-path characteristic compared to foam material absorbers and which, after its operation, represents no further risk, but a genuine improvement in the safety of the occupants of the vehicle.

The energy absorption of the safety shock absorber is effected predominantly by a plurality of successive shearing procedures in the impact pot material. The shearing zones of the individual shearing stages are located along enclosed curves in the manner of vertical layer lines, so that the impact pot of the safety shock absorber forms a type of "stepped pyramid" with an optional plan projection. The configuration provides the substantial advantage that the alteration in geometry of the impact pot during the impact procedure is exactly predetermined. Uncontrolled alterations in geometry which could lead to risk to the occupant are eliminated. The individual damaged areas of the shearing stages are located, as the impact path progresses, one inside the other radially to an increasing or decreasing degree in the manner of telescopic elements or of hotplate rings. Therefore, it is ensured that the safety shock absorber according to the invention is flattened in a defined way as its function progresses, and does not penetrate in rings or zones into the internal space of the motor vehicle.

The force-path characteristic of such a shock absorber may be influenced in a definable way so that the individual shearing force stages or zones have an approximately identical shearing force requirement, and thus the desired requirements may be optimally met. This is achievable in that the geometric transmission between the shearing zones is designed in such a way that bending or folding procedures precede or succeed the shearing procedures. It is, however, also advantageously possible to influence the shearing force requirements of the individual shearing stages since the material of the impact pot has in the individual shearing stages differing wall thicknesses, or since the transitional radii between the individual shearing stages and/or the angle of inclination within the shearing stages are different in design.

A particular advantage results if the safety shock absorber comprises organic and/or inorganic fiber materials, which are consolidated by binders of a known and optional type.

The advantages further include possible variations in the selection of the fiber materials and an optimum influence on the shearing forces via the selection of the material itself. The possibility of simple variation in thickness permits an additional influence on shearing forces. By means of selection of the binder, which is possible within a large range of variations; it is possible to influence the shearing force characteristic, for example, by means of binding agents which render materials flexible.

Safety shock absorbers according to the invention may have their action influenced and improved if they are filled and/or surrounded by a compressible material, for example a polymer foam. Additionally, it is advantageously possible to locate a plurality of impact pots decreasing size one inside the other, or to have a plurality of impact pots acting in parallel.

If safety shock absorbers comprising fiber materials consolidated with binders are used, there results the additional advantage that such a shock absorber may be an integral component of a lateral lining portion, or in the form of a plurality of shells, which are made of the same fiber material.

Apart from the fact that the identity of materials offers advantages in terms of recycling, which will gain importance in the future, it is also possible to unify a plurality of functions in one part, for example to use the safety shock absorber integrally with the internal lining, in order to reinforce the lining. In the case of multi-shell lining parts, functional areas of a shell such as a map pocket, recesses for arm rests or the like may be designed as safety shock absorbers.

BRIEF DESCRIPTION OF THE DRAWINGS

The invention will be explained in more detail in the following with reference to the enclosed drawings, which represent embodiment given by way of simplified clear examples wherein.

DESCRIPTION OF THE PREFERRED EMBODIMENT

Figure 1:
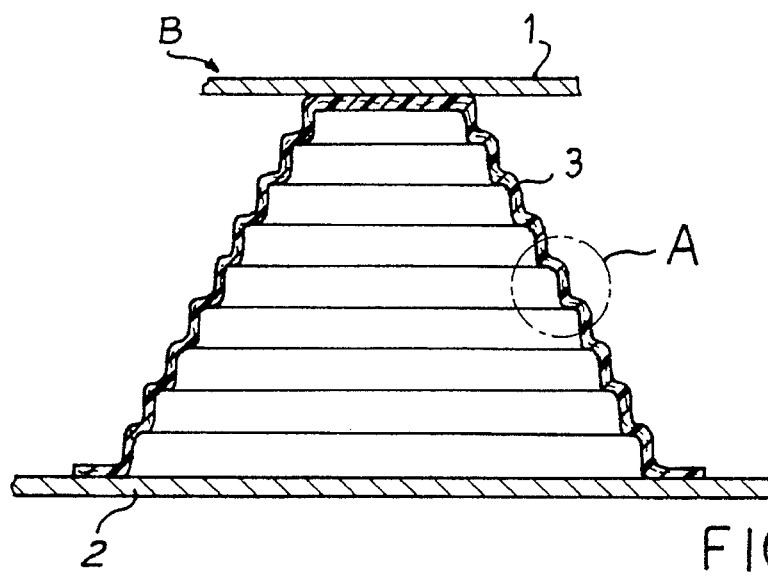
FIG. 1 is a diagrammatic lateral section through a pyramidally stepped safety shock absorber according to the invention.

As FIG. 1 shows, the shock absorber is in the form of an impact pot B which in cross-section is reminiscent of a terrace shape or of a stepped pyramid. The individual steps of the pyramid, whose planned projection can be of any shape, form shearing zones 3. The external diameter of the uppermost shearing zone corresponds roughly to the internal diameter of the subsequent shearing zone and so on. The step of the impact pot with the smallest diameter in the embodiment, i.e. in FIG. 1 the uppermost shearing zone, abuts directly on the external or bodywork metal 1 of the vehicle. The lowest or internal shearing zone with the largest diameter is secured at the rear to the inner lining 2 of the visible side in the passenger compartment. The impact pot B comprises a plurality of such stepped shearing zones 3 adjacent to one another. It is immaterial whether the shearing zone with the largest diameter abuts on the inner lining 2 or on the outer skin 1. Shearing zones 3 with respectively large or small diameter may also abut both the outer skin 1 and the inner lining 2. In the first case the shearing zones 3 are formed towards the center symmetrically or asymmetrically increasing in diameter. In the second case the shearing zones 3 are formed decreasing in diameter.

Figure 2:
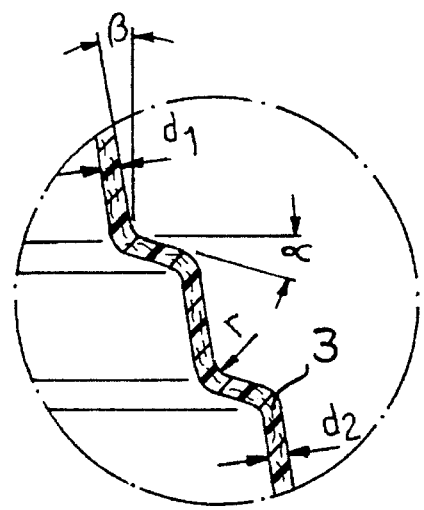
FIG. 2 is an enlarged view of the area A from FIG. 1.

The area A in FIG. 1 is shown on an enlarged scale in FIG. 2. This enlargement is intended to show that both the thickness or wall thickness $d_1$ and $d_2$ can vary between the individual shearing zones 3 as well as the transitional radius r from one shearing zone to the other. The individual stepped shearing zones adjacent to one another 3 can stand vertically to one another at an angle of inclination beta ($\beta$). The stepped plateaus between adjacent shearing zones 3 may be inclined at a stepped plateau angle $\alpha$.

Both the variable wall thicknesses $d_1$ and $d_2$ and also the angle of inclination $\beta$, the transitional radius r and the stepped plateau angle $\alpha$ may be used as influencing parameters on the shearing forces to be absorbed from shearing zone to shearing zone. Thereby, the entire progress of the shearing behavior of the impact pot B may be predetermined via these magnitudes. Shearing behavior can be predetermined with the outset position shown in FIG. 1 until a compressed final position, in which the individual shearing zones are pushed telescopically into one another after occurrence of an impact, and corresponding deformation of the outer skin 1 in the direction of the inner lining 2. Growing wall thicknesses d from the shearing zones 3 with larger diameter to this with smaller diameter enable the shearing forces to remain approximately identical between the shearing zones, even though the respective plan projection of the individual shearing zones decreases as the diameter decreases and thus the shearing length of each step. The radius r influences the position of the shearing zone in the impact pot B and correspondingly also influences the alteration in the angles of inclination $\alpha$ and $\beta$ which define the step strength between the shearing zones.

Figure 3:
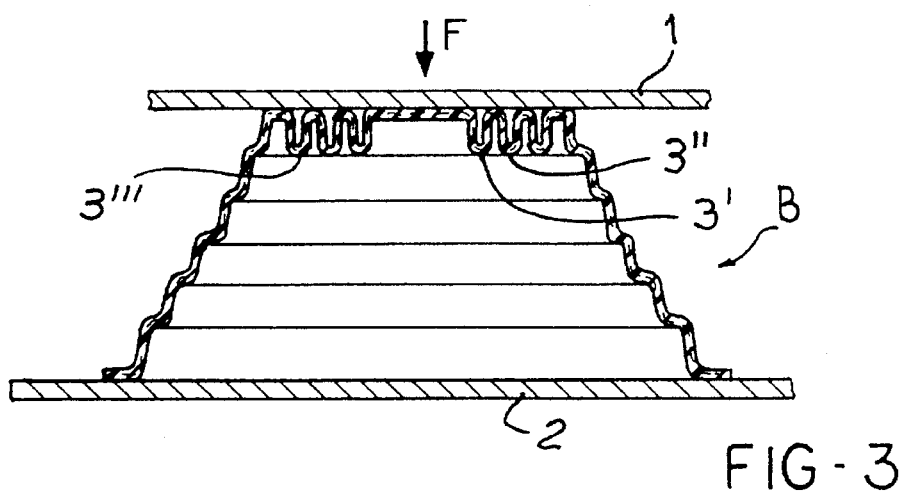
FIG. 3 is a view according to FIG. 1 during initial absorption of an impact.

The view in FIG. 3 corresponds substantially to the cross-sectional view of the impact pot B after the action of a force F in the direction of the arrow on the bodywork metal 1. The external shearing zones 3', 3", 3''' have been pushed one into the other by shearing deformation, which corresponds to an absorption of momentum during an impact accident. If the individual steps of the shearing zones have substantially the same height, in the totally compressed state of the impact pot, this is still only one shearing step thick. The clear width of the largest shearing portion is substantially filled by the other shearing zones. In this way, contrary to other impact devices, such as foam material parts, the necessarily small deformation path is totally used, maintaining a substantially constant average absorption of force. If the hollow space provided previously according to FIG. 1 within the impact pot is in addition filled with a compressible buffer material, the effect of impact absorption of the impact pot may be further increased.

The shearing craft deformation of the impact pot may be advantageously improved if the latter is formed by a pressed part, comprising organic and/or inorganic fiber materials. Such materials may be lignocellulose fibers, which may be compressed and formed, with appropriate binders, by the action of heat and pressure, into rigid three-dimensional molded parts. The hollow space of the impact pot may be filled with a polymer foam or other such compressible material.

Figure 4:
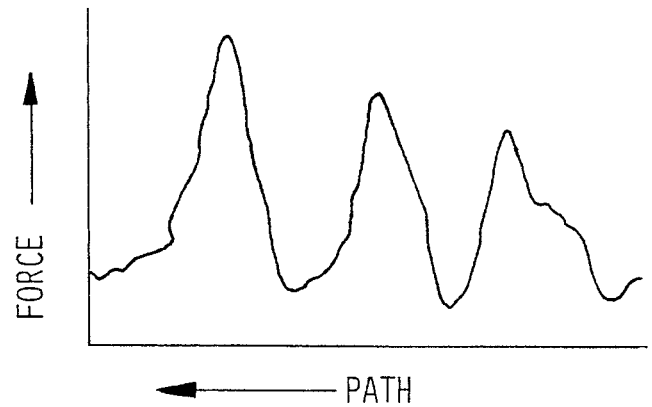
FIG. 4 is a graphical view of a given force-path characteristic of the shearing forces taken up by the shock absorber.

FIG. 4 shows by means of a force-path diagram the stress occurring during an impact on the safety shock absorber causing shearing off of the first three shearing zones according to FIG. 3. As can be seen from the drawing, the increase in shearing forces from shearing zone to shearing zone with reference to the given maxima remains relatively small, preventing sudden collapse of the force absorption by the impact pot.

Figure 5:
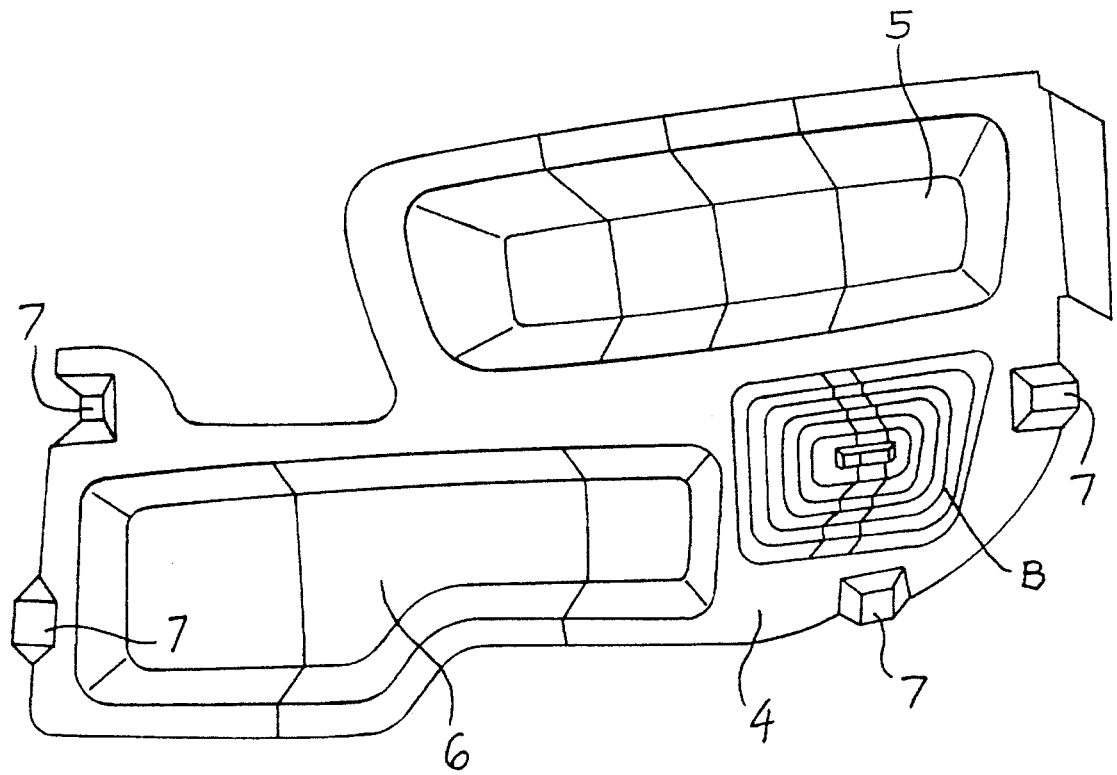
FIG. 5 is a plan view of the rear side of the inner lining of a door of a private motor vehicle, with the stereometric view of the integrated safety shock absorbers corresponding to the present shaping.

Finally, FIG. 5 shows in a given embodiment a pressed molded part of fiber material provided with binders for a lateral lining of the door of a private motor vehicle. This door lining is substantially characterized by a spatially shaped arm rest 5 and a correspondingly shaped map pocket 6 as well as by an impact pot B produced in the same deformation procedure between the two former. In the example shown, only the impact pot B is designed as a shock absorber with its zone steppings, by absorption of shearing forces. It is however feasible and advantageous also to design the armrest 5 and/or the map pocket 6 correspondingly as shock absorbers in accordance with the impact absorber. For this purpose the stepping becomes recognizable on the visible side of the inner lining of the door which can be optimally smoothed by appropriate lining, if necessary with additional lining filler materials. The stop means 7 in the view in FIG. 5 serve to reattach the inner lining portion on the bodywork or on the outer skin of the door. In FIG. 5, a plurality of impact pots may be located in an internal lining molded part both next to one another and also one inside the other. At least one such shock absorber may be an integral component of a lateral lining portion which is, if necessary, multi-shelled. In the case of a multi-shelled lateral lining portion, the double function of map pockets, armrests or the like on the one hand, and their utilization as an impact pot on the other hand may be particularly advantageously realized.

What is claimed is:

1. A shock absorber for improving safety in passenger compartments of motor vehicles during impact accidents, preferably for impact reduction between an outer skin of bodywork parts and an associated inner lining in the passenger compartment, the shock absorber comprising:

an impact pot wherein energy absorption is partially effected by a plurality of shearing procedures of an absorbing material, said plurality of shearing procedures occur in chronological sequence upon impact, and wherein the impact pot is subdivided into shearing zones for the sequence of shearing procedures, said zones defined by longitudinally enclosed curves.

2. The shock absorber according to claim 1, wherein the impact pot forms a stepped pyramid.

3. The shock absorber according to claim 1, wherein the individual shearing zones have a base surface and approximately identical impact absorption properties.

4. The shock absorber according to claim 1 further comprising approximately constant predetermined identical shearing forces beneath the individual shearing zones wherein at least one combination of materials and material thickness and shape properties is varied.

5. The shock absorber according to claim 1, further comprising dimensionally stable compressed fiber material.

6. The shock absorber according to claim 1 wherein each individual shearing zone has a transitional radii and are individually stepped in relation to one another.

7. The shock absorber according to claim 1, wherein the shock absorber is built from a plurality of alternating offset impact pots.

8. The shock absorber according to claim 1 wherein the shock absorber has a shape, determining the periphery, and corresponding at least approximately to a shaping of an associated region of inner lining of a portion of the passenger compartment to be protected.

9. The shock absorber according to claim 1 wherein the impact pot forms a terrace arrangement with plan projections.

10. The shock absorber of claim 6 wherein the end transitional radii of the individual shearing zones have angles different in design within the shear stepping.

11. The shock absorber of claim 7, wherein the impact pots are nested.

12. The shock absorber of claim 7, wherein the impact pots are nested in one another.

13. The shock absorber according to claim 1 further comprising:

a predetermined shearing force beneath the individual shearing zones, wherein at least one property of material, material thickness and shape is varied.

* * * * *